United States Patent [19]
Paske et al.

[11] Patent Number: 6,161,804
[45] Date of Patent: Dec. 19, 2000

[54] TRANSMISSION LINE HANGER

[75] Inventors: Jamie M. Paske, Oak Lawn; Jonas V. Aleksa, Plainfield; Frank A. Harwath, Downers Grove; Christopher R. Stockman, New Lenox, all of Ill.

[73] Assignee: andrew corporation, Del.

[21] Appl. No.: 09/229,843

[22] Filed: Jan. 12, 1999

[51] Int. Cl.[7] .................................................. F16L 3/08
[52] U.S. Cl. .............................. 248/74.1; 248/71; 248/73
[58] Field of Search ............................. 248/74.1, 71, 73, 248/68.1, 74.2, 74.3, 231.8; 24/17 AP, 16 PB; 343/890–892, 874; 333/248, 254; 138/106, 107

[56] References Cited

U.S. PATENT DOCUMENTS

| | | | |
|---|---|---|---|
| 396,677 | 1/1889 | Zimmerman | 248/71 |
| 2,065,843 | 12/1936 | Uum | 248/73 |
| 2,397,680 | 4/1946 | Morehouse | 248/74 |
| 2,453,980 | 11/1948 | Hartman | 248/68.1 |
| 2,682,385 | 6/1954 | Schluter | 248/262 |
| 2,716,703 | 8/1955 | Kane | 250/33.52 |
| 2,941,768 | 6/1960 | Elms et al. | 248/71 |
| 2,981,513 | 4/1961 | Brown | 248/73 |
| 3,131,447 | 5/1964 | Tinnerman | 24/81 |
| 3,154,281 | 10/1964 | Frank | 248/201 |
| 3,237,905 | 3/1966 | Baker et al. | 248/361 |
| 3,345,706 | 10/1967 | Stokes | 24/73 |
| 3,346,863 | 10/1967 | Siebold | 348/702 |
| 3,444,596 | 5/1969 | Soltysik | 24/73 |
| 3,501,117 | 3/1970 | Soltysik | 248/71 |
| 3,822,411 | 7/1974 | Merle | 333/95 |
| 4,047,133 | 9/1977 | Merle | 333/95 |
| 4,334,659 | 6/1982 | Yuda | 248/73 |
| 4,505,006 | 3/1985 | Andre | 24/16 |
| 4,572,466 | 2/1986 | Yamaguchi et al. | 248/73 |
| 4,654,612 | 3/1987 | Smith | 333/248 |
| 4,763,132 | 8/1988 | Juds et al. | 343/890 |
| 4,813,639 | 3/1989 | Midkiff et al. | 248/68.1 |
| 4,958,792 | 9/1990 | Rinderer | 248/74.2 |
| 5,167,533 | 12/1992 | Rauwolf | 439/583 |
| 5,334,051 | 8/1994 | Devine et al. | 439/583 |
| 5,967,468 | 10/1999 | Veghte | 248/71 |

FOREIGN PATENT DOCUMENTS

| | | |
|---|---|---|
| 1000677 | 11/1976 | Canada . |
| 16882 | 10/1959 | Denmark . |
| 0 183 394 | 6/1986 | European Pat. Off. . |
| 2 417 870 | 2/1979 | France . |
| 2 483 541 | 12/1981 | France . |
| 710034 | 7/1941 | Germany . |
| 6912883 | 3/1969 | Germany . |
| 2807119 | 8/1979 | Germany . |
| 1062633 | 3/1967 | United Kingdom . |

OTHER PUBLICATIONS

ICESCo™ Accessories article entitled Universal Snap–In Hangers for Wireless Applications.

*Primary Examiner*—Anita M. King
*Assistant Examiner*—Gwendolyn Baxter
*Attorney, Agent, or Firm*—Jenkens & Gilchrist

[57] ABSTRACT

In one aspect, a transmission line hanger is provided for securing a transmission line having a protective jacket to a supporting structure having an aperture defined by a wall. The transmission line hanger includes a transmission line retention section for retaining a transmission line. The transmission line hanger further includes an extended section extending from the retention section. The extended section includes a spring finger flexibly connected thereto, and projecting inwardly therefrom. The spring finger is configured to penetrate into the jacket once the transmission line is inserted into the hanger. The spring finger minimizes longitudinal movement of the transmission line with respect to the hanger. The extended section, in conjunction with the spring finger, allows the hanger to accommodate a large range of different transmission line diameters.

40 Claims, 13 Drawing Sheets

TRANSMISSION LINE HANGER

FIELD OF THE INVENTION

This invention relates generally to transmission lines, and in particular to transmission line hangers for supporting transmission lines used in antenna systems.

BACKGROUND OF THE INVENTION

Transmission line hangers are used to support transmission lines. Transmission lines are supported by attaching them to supporting structures by transmission line hangers. The most extensive use of hangers is in connection with coaxial cables, such as those disclosed in U.S. Pat. No. 5,334,051 (Devine et al.) and 5,167,533 (Rauwolf). Coaxial cables are extensively used for carrying a variety of electromagnetic signals. In most uses, the cables need to be attached to a supporting structure along most of their lengths.

Transmission line hangers are also used for supporting waveguides which carry electromagnetic signals from transmitting or receiving equipment in an equipment shelter to an antenna mounted on a tall tower. A large number of hangers are required to support a waveguide beneath a horizontal waveguide bridge extending between the shelter and the base of the tower and to support the waveguide on the tower as the waveguide extends upwardly to the antenna. An even larger number of hangers are required where separate waveguides extend to several antennas on a signal tower. Commercially available waveguides have a variety of cross-sectional shapes. For example, a variety of waveguide shapes are disclosed in U.S. Pat. Nos. 3,822,411 (Merle) and 4,047,133 (Merle).

A typical hanger for elliptical-shaped waveguides includes a generally U-shaped clip adapted to be attached to a support member on the bridge or the tower by a bolt extending through a hole in the support member and held in place by a nut and lock washer. After the hangers have been attached to the support members, the waveguide is strung along the bridge, up the tower and clamped between the legs of each U-shaped hanger by tightening a clamping screw which extends between the legs. A considerable amount of installation time is required, first to attach the large number of hangers to the bridge and the tower and then to clamp the waveguide within the hangers. In addition, a large amount of auxiliary hardware (e.g., screws, bolts, nuts and washers) is required along with the hangers themselves.

Figure 1:
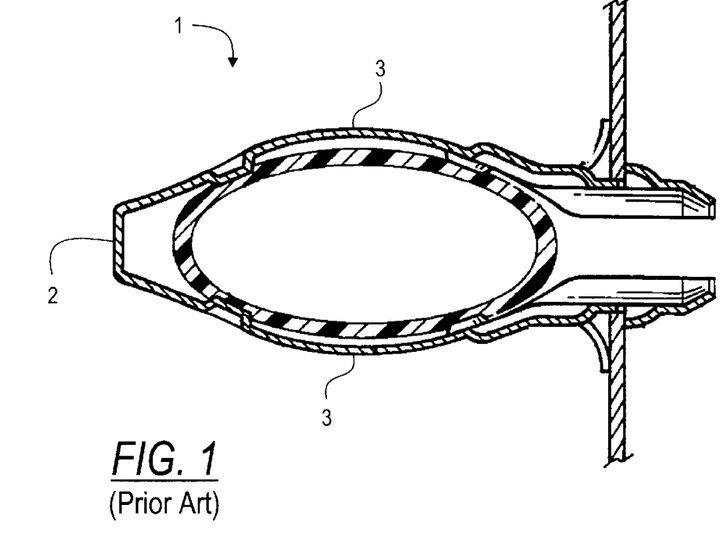
FIG. 1 is a cross-sectional view of a prior art waveguide hanger.

A spring hanger system for supporting a VHF circular waveguide is disclosed in U.S. Pat. No. 4,654,612 (Smith). A variety of prior hangers for microwave transmission lines are disclosed in Andrew Corporation Catalog #36. An improved waveguide hanger is disclosed in U.S. Pat. No. 4,763,132 (Juds et al.). The waveguide hanger disclosed in the Juds et al. patent is in the form of a resiliently yieldable and generally U-shaped clip 1, illustrated in FIG. 1, that is adapted to be slipped over an elliptical waveguide and snapped into a supporting member. The clip includes a hinge portion 2 that extends between the legs 3 of the clip 1.

Figure 2:
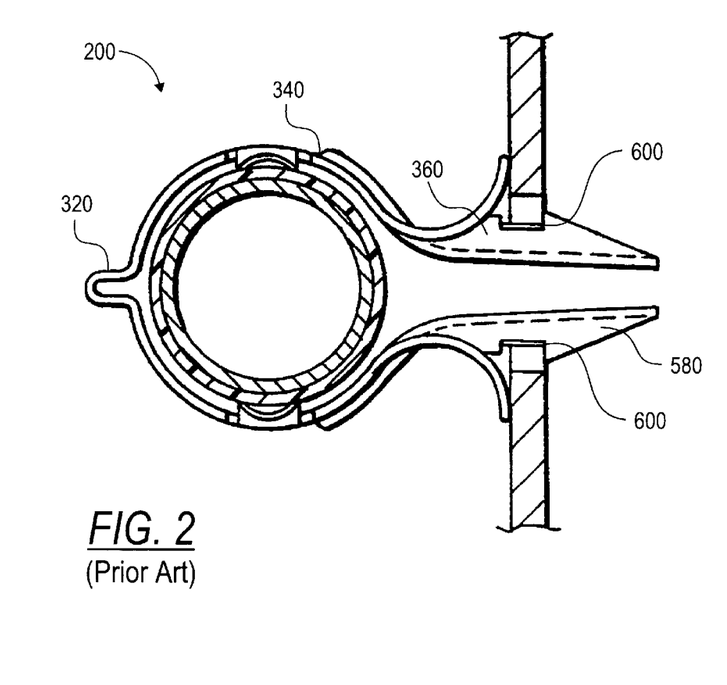
FIG. 2 is a cross-sectional view of a prior art cable hanger.

Another cable hanger is disclosed in U.S. Pat. No. 5,393,021 (Nelson). As illustrated in FIG. 2, the cable hanger 200 disclosed there includes a hinge section 320, a cable retention section 340, and a structure attachment section 360 having two locking members 580 that each include a pair of concave locking barbs 600.

Cable hangers that include hinges can only accommodate a limited range of cable diameters. The maximum cable diameter accepted by such cable hangers is limited by the maximum circumference of the cable retention section.

Prior cable hangers, such as Nelson and Juds et al., also place the cable retention section close to the attachment section. Thus, the attachment section is traditionally short in length. This makes the attachment section rigid and non-compliant which makes installation of such hangers difficult especially where a large diameter cable is being installed on a tower or where the weather conditions limit manual dexterity, e.g., cold weather. In such situations, tools may be required to squeeze the hanger into the tower aperture. The use of tools is undesirable especially where a cable is being installed on a high tower.

Furthermore, some prior hanger designs do not adequately prevent longitudinal movement of the cable with respect to the hangers. Hangers without mechanisms for penetrating or biting into the cable jacket can not prevent longitudinal movement of the cable because the frictional coefficient between the metal hanger and the plastic cable jacket is very low, since the polyethylene typically used for cable jackets is a soft material that has an inherent lubricant quality. In addition, the cable jacket can "cold flow" which reduces the holding force of the cable hanger over time, resulting in cable slippage.

The installation of transmission line hangers is often a difficult and time-consuming operation because of the large amount of auxiliary hardware required to install some prior hangers. Therefore, there is a continuing need for efficient, inexpensive hangers and for improved methods of installing them. The present invention addresses these needs by providing a transmission line hanger that can be easily and efficiently installed, is expandable to accommodate a large number of transmission line diameters, and can reduce longitudinal movement of the transmission line within the hanger, and is inexpensive to produce.

SUMMARY OF THE INVENTION

In one aspect, a transmission line hanger is provided for securing a transmission line to a supporting structure having an aperture defined by a wall. The transmission line hanger includes a partially cylindrical member for accommodating a transmission line. The partially cylindrical member includes a first leg and a second leg each respectively extending from the partially cylindrical member. The first and second legs allow the hanger to accommodate various sizes of transmission lines. The first and second legs each include a first section for contacting the wall of the aperture at one of a pair of contact points, and a second section extending from the first section and forming a locking barb configured to lock against the supporting structure once the locking barb is inserted through the aperture.

In another aspect, a transmission line hanger is provided for securing a transmission line having a protective jacket to a supporting structure having an aperture defined by a wall. The transmission line hanger includes a transmission line retention section for retaining a transmission line. The transmission line hanger further includes an extended section extending from the retention section. The extended section includes a spring finger flexibly connected thereto, and projecting inwardly therefrom. The spring finger is configured to penetrate into the jacket once the transmission line is inserted into the hanger. The spring finger minimizes longitudinal movement of the transmission line with respect to the hanger. The extended section, in conjunction with the spring finger, allows the hanger to accommodate a large range of different transmission line diameters.

BRIEF DESCRIPTION OF THE DRAWINGS

FIG. 3b is a partial cross-sectional perspective view taken along line 3b—3b in FIG. 3a;

FIG. 6 is a front view of the transmission line hanger and supporting structure of FIG. 3a;

FIG. 7 is a bottom view of the transmission line hanger and supporting structure of FIG. 3a;

FIG. 10b is a side view of the transmission line hanger of FIG. 10a;

FIG. 11b is a side view of the transmission line hanger of FIG. 11a.

DESCRIPTION OF ILLUSTRATIVE EMBODIMENTS

It has been discovered that transmission lines can be efficiently and inexpensively supported by using unitary transmission line hangers, such as a transmission line hanger 10 according to the present invention. A unitary hanger is cheaper to produce and more reliable than hangers composed of several pieces. However, a hanger having two or more pieces that are, for example, welded together, would function the same as the unitary hanger described herein.

A plurality of transmission line hangers 10 are used to support a variety of types of transmission lines, including circular coaxial cables and waveguides, having a variety of diameters. A plurality of transmission line hangers 10 generally secure one transmission line to a supporting structure, such as a horizontal transmission line bridge or a vertical antenna tower. The transmission line hangers 10 are easy to install because no ancillary hardware is required such as nuts, bolts or screws.

Figure 3A:
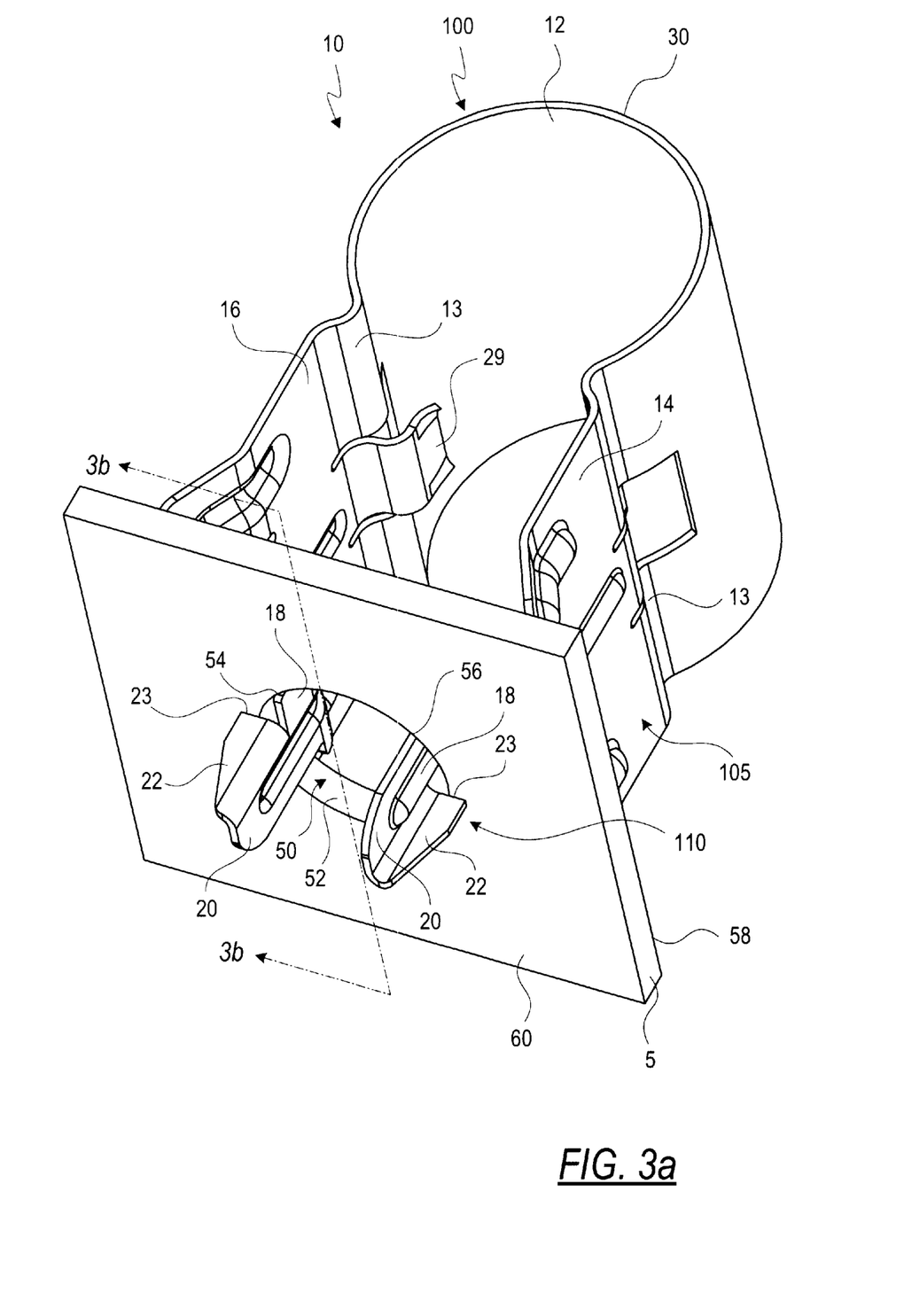
FIG. 3a is a perspective view of the transmission line hanger according to the present invention in a supporting structure.
Figure 3B:
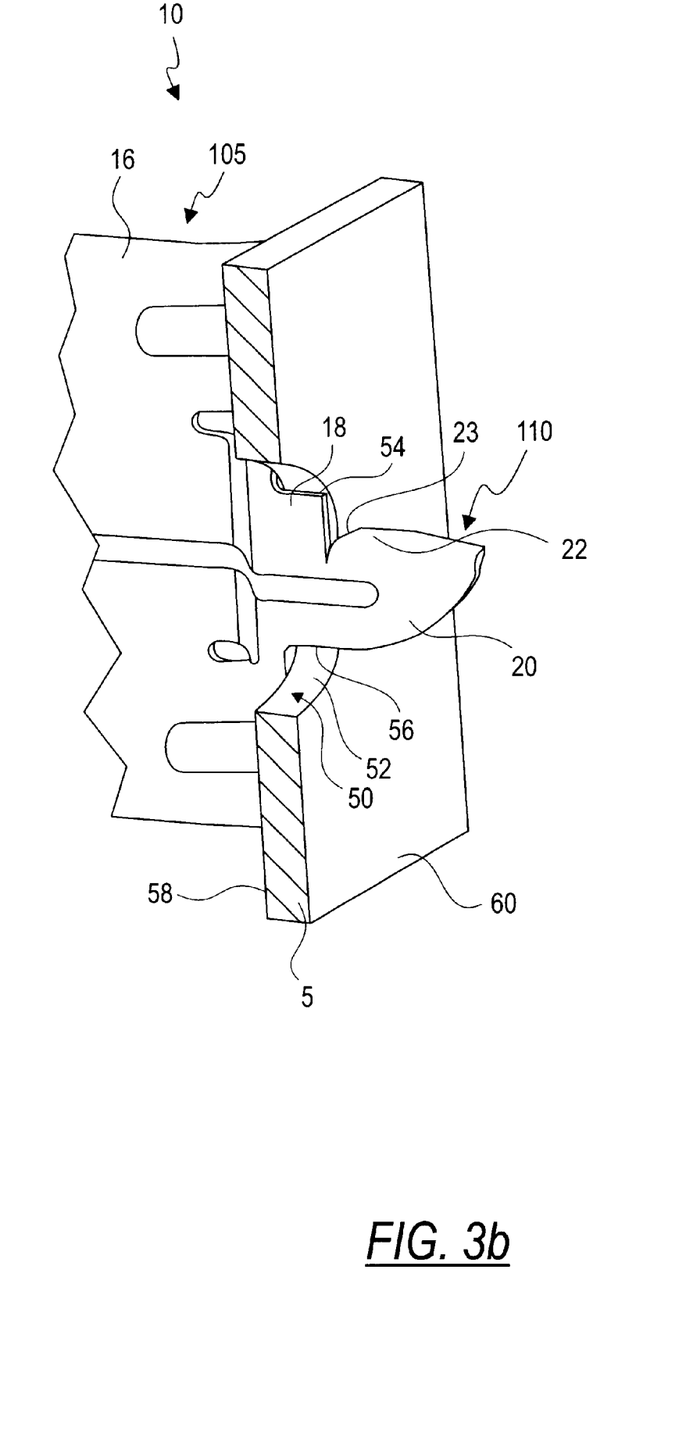

The present invention will now be described in connection with the embodiments shown in the drawings. Referring first to FIGS. 3a and 3b, the transmission line hanger 10 and a supporting structure 5 are illustrated. In the illustrated embodiment, the hanger 10 is a unitary structure essentially composed of metal. In one embodiment, the hanger 10 is composed of stainless steel having a thickness of 0.76 mm. The illustrated hanger 10 includes a transmission line retention section 100, an extended section 105 and an attachment section 110. The transmission line retention section 100 includes a partially cylindrical member 12 that accommodates a transmission line. The partially cylindrical member 12 includes a first leg 14 and a second leg 16 that comprise the extended section 105. The first leg 14 and the second leg 16 each respectively extend from the partially cylindrical member 12. A compliant area 13 is disposed between the legs 14 and 16, respectively, and the partially cylindrical member 12 and allows the first and second legs 14 and 16 to be pressed together. In one embodiment, the extended section 105 includes a pair of spring fingers 29 projecting inwardly from the extended section 105 and into the transmission line retention section 100, as illustrated in FIG. 3a.

The compliant area 13 between the legs 14 and 16 and the partially cylindrical member 12, in conjunction with the spring fingers 29, allow the hanger 10 to have the necessary compliance to accommodate a large range of different transmission line diameters. The extended section 105 has the compliance to allow the hanger 10 to accommodate a large range of transmission line diameters and still allow the attachment section 110 to be inserted into the supporting structure 5. Prior hangers without an extended section between the transmission line retention section and the attachment section had essentially no compliance. Thus, in these prior designs, if a transmission line larger than the diameter that the transmission line retention section could accommodate was inserted into the hanger, then the attachment section would not be able to be squeezed to allow the attachment section to be inserted into an aperture in the supporting structure.

Unlike prior hangers, the shape of the retention section 100 and the attachment section 110 of the hanger 10 do not change significantly in response to supporting different diameter transmission lines. In contrast, the pliability of the spring fingers 29 allows the spring fingers 29 to flex inward with respect to the extended section 105. The pliability of the extended section 105 allows the attachment section 110 to be inserted into the supporting structure 5 without significantly changing the shape of the transmission line retention section 100 despite different diameter transmission lines being supported by the hanger 10.

Referring again to FIGS. 3a and 3b, the attachment section 110 includes a first section 18 that extends from each of the first and second legs 14 and 16, respectively. The supporting structure 5 includes a circular aperture 50 defined by a wall 52. The first section 18 contacts the wall 52 at one or both of the pair of contact points 54 and 56. A second section 20 extends from the first section 18 and forms a locking barb 22 that is configured to lock against the supporting structure 5 once the locking barb is inserted through the aperture 50. The supporting structure 5 includes an outer surface 58 and an inner surface 60. The surfaces of the supporting structure may be rough due to, for example, irregularities, bubbles and/or barbs caused by the galvanizing process and/or the punching process that produces the aperture 50. Therefore, each locking barb 22 includes a barb contact point 23. Each locking barb 22 contacts the inner surface 60 of the supporting structure 5 at the barb contact point 23. Because the hanger 10 includes two locking barbs 22, one on each leg (14, 16), the hanger 10 can be more securely attached to the supporting structure 5 despite any irregularities on the inner surface 60. As best illustrated in FIG. 3b, the locking barb 22 is integral with the second section 20 and extends from and is generally orthogonal thereto.

The wall 52 of the aperture 50 may also be rough because of irregularities, bubbles and/or barbs caused by the galvanizing process and/or the punching process that produces the aperture 50. Therefore, in one embodiment, contact with these irregularities is minimized by having the first section 18 of the hanger 10 only contact the wall 52 at one or both of the pair of contact points 54 and 56.

Figure 4:
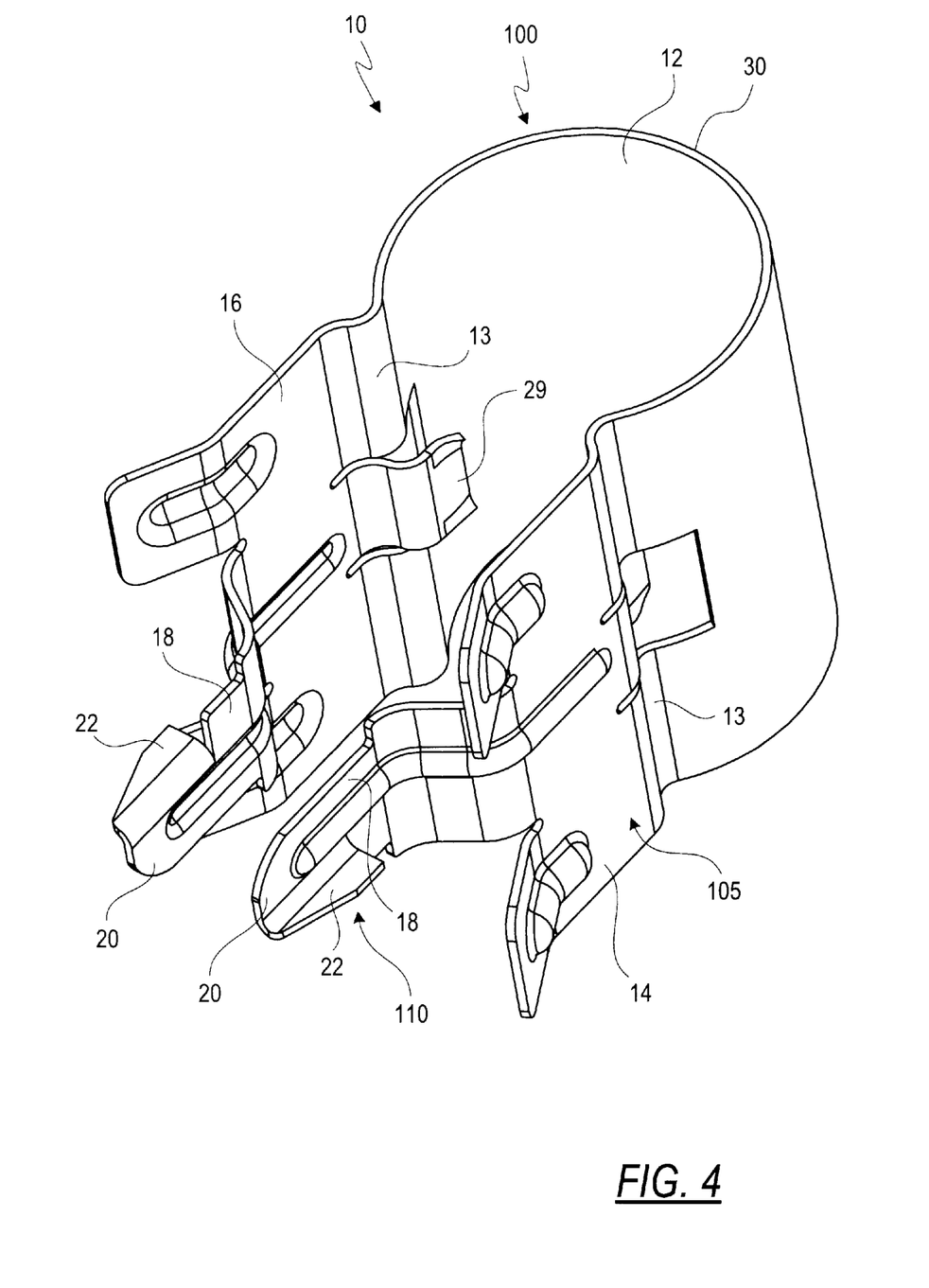
FIG. 4 is a perspective view of a transmission line hanger having spring fingers.
Figure 5:
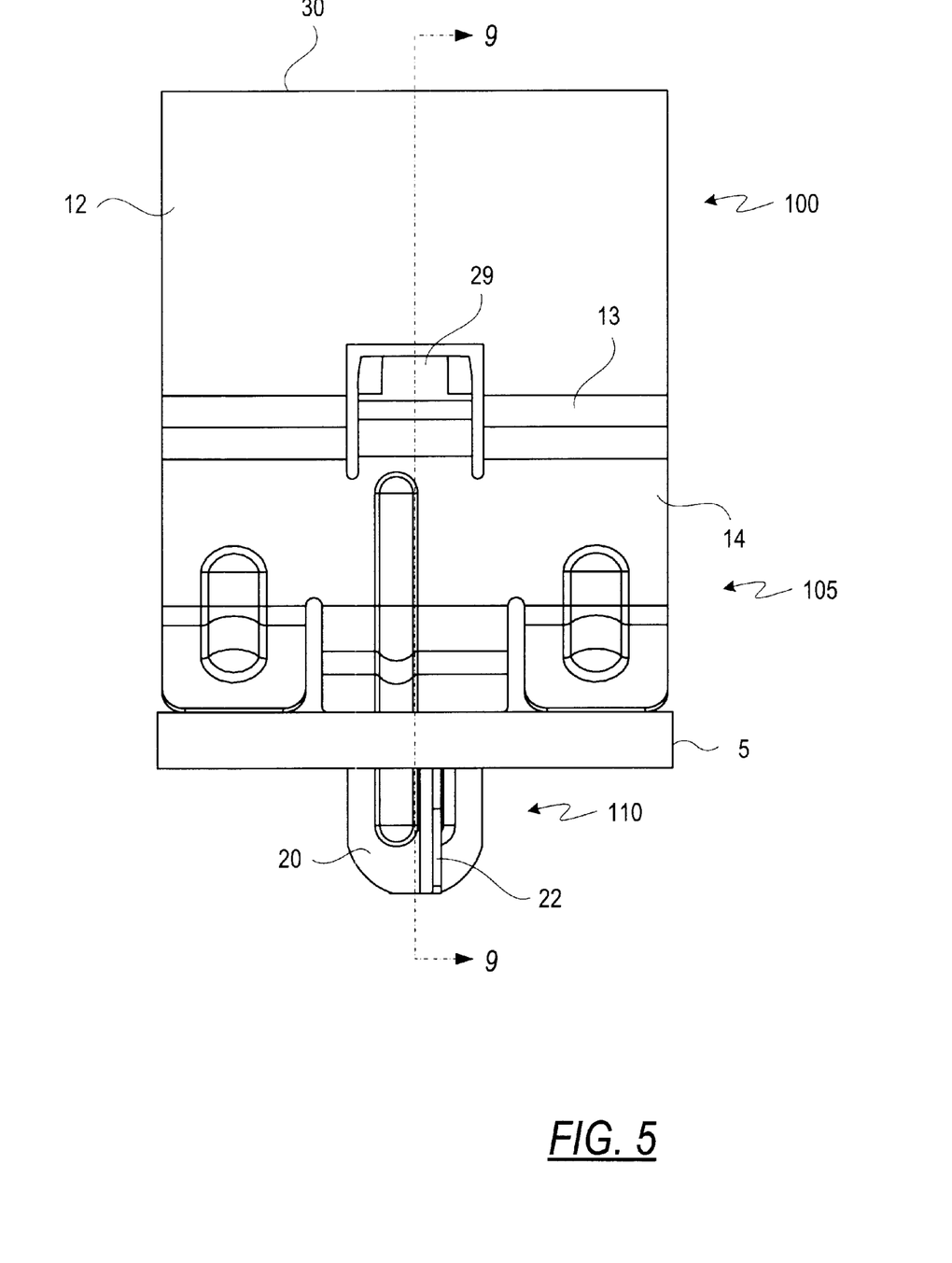
FIG. 5 is a side view of the transmission line hanger of FIG. 4.

As best shown in FIGS. 3a and 4, in one embodiment, the compliant area 13 is provided by a fulcrum or bend. The compliant area 13 enables the first and second legs 14 and 16 to be pressed together thus allowing the locking barbs 22 to fit through the aperture 50 in the supporting structure 5. The compliant area 13 also allows the first and second legs 14 and 16 to expand by spring force once the locking barb 22 is inserted through the aperture 50. This expansion brings the first section 18 into contact with the wall 52 of the aperture 50 at one or both of the pair of contact points 54 and 56.

The design of the hanger 10, and in particular the extended section 105, allows for easy installation of the hanger 10. Specifically, the extended section 105 allows larger diameter transmission lines to be inserted into the hanger 10. The user then wraps his or her fingers around the hanger 10, and the transmission line therein, and presses the legs 14 and 16 together. The extended section 105 places the transmission line retention section 100 further away from the supporting structure 5. In addition, the attachment section 110 is closer to the user's fingers and thumb thus allowing a greater range of motion and greater force to be applied to the hanger 10 when inserting the attachment section 110 into the supporting structure 5. The extended section 105 also gives the user more room to work, and avoids the user's hands from hitting the supporting structure 5 during installation.

The design of the hanger 10, and in particular the extended section 105, also provides a more dynamic snap-in action than prior hangers when the hanger 10 is installed into a supporting structure. The two locking barbs 22 also provide less insertion resistance than prior hanger designs having four locking barbs. Having only two locking barbs 22 reduces the number of contact points that must contact the outer surface 58 of the supporting structure 5 during insertion of the hanger 10 into the supporting structure 5. Additionally, the two barb design of the attachment section 110 reduces insertion resistance by reducing the cam pressure required and the amount of deflection required to insert the hanger 10 into the supporting structure 5. This reduces the amount of force s required to insert the hanger 10 into a supporting structure. The hanger 10 thus requires less manual dexterity to install and uninstall than prior hangers. In addition, the ergonomical design allows for easier installation. These are important features especially where the typical transmission line is in excess of 1,000 feet and a hanger is mounted every three feet. Consequently, hundreds of hangers must be installed to support such a transmission line. The man hours required for such an installation is great. Accordingly, transmission line installation is costly. In addition, it can be difficult to find someone willing to install such hangers high above the ground, especially if extra hardware is required to install the hangers. Therefore, a hanger that requires less installation time and that is easier to install reduces the man hours required for installation, thus reducing installation costs.

Figure 6:
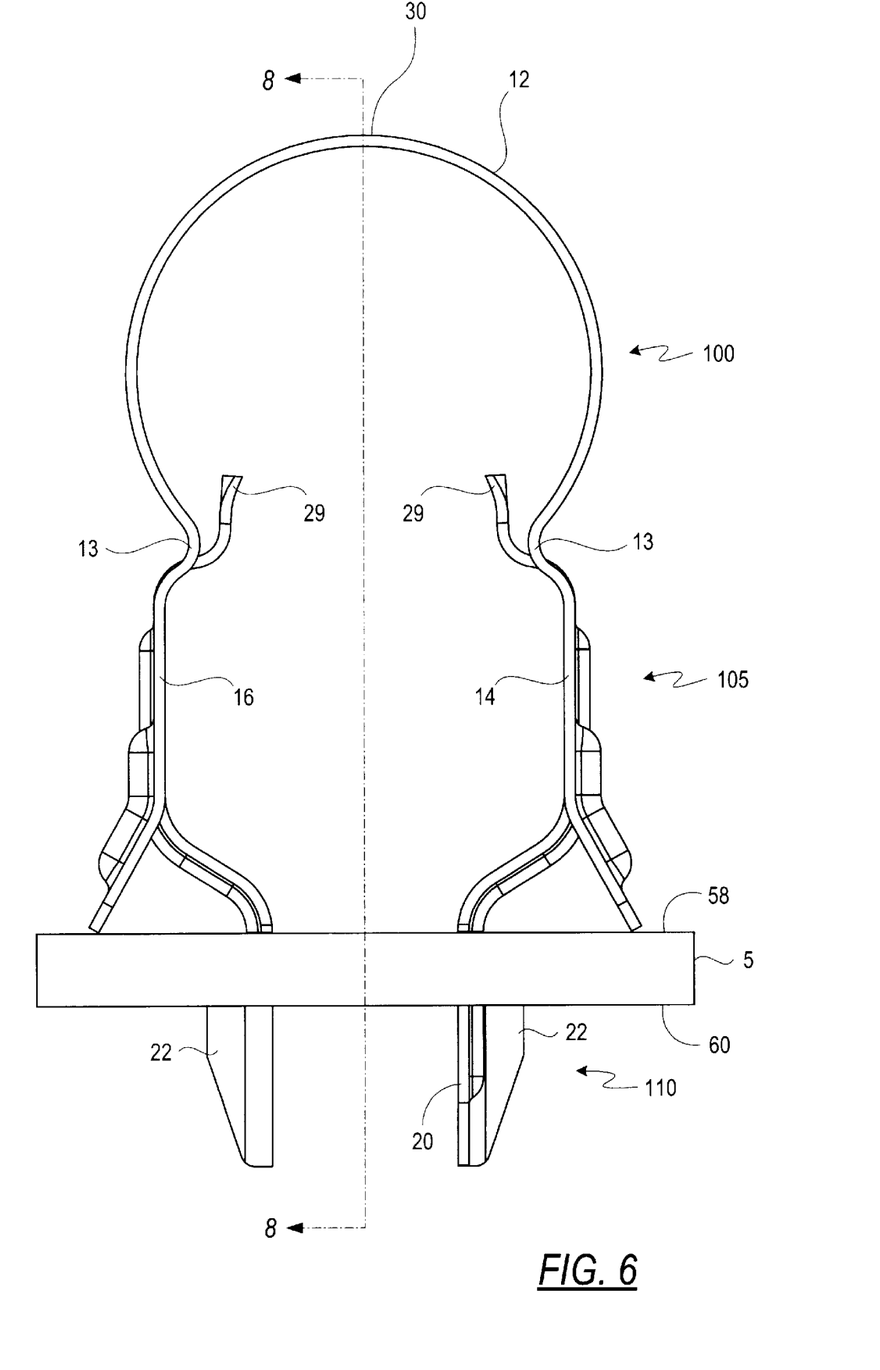

The pair of spring fingers 29 are best illustrated in FIG. 6. The first leg 14 includes one of the pair of spring fingers 29 flexibly connected thereto, and projecting inwardly therefrom. The second leg 16 includes a second of the pair of spring fingers 29 flexibly connected thereto, and projecting inwardly therefrom. The spring fingers 29 are flexibly connected to the legs 14 and 16 such that when a transmission line is inserted into the hanger 10 the spring fingers 29 flex outward with respect to the legs 14 and 16, respectively, and force the transmission line against the top potion 30 of the partially cylindrical member 12. Thus, the spring fingers 29 provide spring resistance against the transmission line after it is inserted in the hanger 10. The spring fingers 29 also penetrate or bite into the jacket of the transmission line to further secure the transmission line within the hanger 10. The spring fingers 29 help minimize the longitudinal movement of the transmission line in the hanger 10. Longitudinal movement is defined as movement in a direction parallel to the length of the transmission line. The spring fingers 29 also help minimize transmission line vibration.

In another embodiment, the extended section 105 includes one spring finger 29 projecting inwardly from the extended section 105 and into the transmission line retention section 100. For example, the first leg 14 may include one spring finger 29 flexibly connected thereto, and projecting inwardly therefrom. The one spring finger 29 is flexibly connected to the first leg 14 such that when a transmission line is inserted into the hanger 10 the spring finger 29 flexes outward with respect to the first leg 14 and forces the transmission line against the top left potion of the partially cylindrical member 12. Thus, the one spring finger 29 can provide spring resistance against the transmission line after it is inserted in the hanger 10. The one spring finger 29 also bites into the jacket of the transmission line to further secure the transmission line within the hanger 10. The one spring finger 29 helps minimize the longitudinal movement of the transmission line in the hanger 10. The one spring finger 29 also helps minimize transmission line vibration. Alternatively, the second leg 16 may include one spring finger 29 flexibly connected thereto, and projecting inwardly therefrom, that forces the transmission line against the top right portion of the partially cylindrical member 12. In either case, the extended section 105, in conjunction with the one spring finger 29, allows the hanger 10 to accommodate a large range of different transmission line diameters by having the compliance to expand for larger transmission lines. The extended section 105 and the one spring finger 29 also have the compliance to allow the hanger 10 to accommodate a large range of transmission line diameters while still allowing the attachment section 110 to be inserted into the supporting structure 5.

In the illustrated embodiments, the extended section 105, in conjunction with the pair of spring fingers 29, allows the hanger 10 to accommodate a large range of different transmission line diameters by having the compliance to expand for larger transmission lines. The extended section 105 and the spring fingers 29 also have the compliance to allow the hanger 10 to accommodate a large range of transmission line diameters while still allowing the attachment section 110 to be inserted into the supporting structure 5.

No matter how the transmission line is disposed in the hanger 10, the two opposing spring fingers 29 will provide spring resistance against the transmission line, which in turn will force the transmission line against the top portion 30 of the partially cylindrical member 12, and bite into the jacket of the transmission line.

Figure 7:
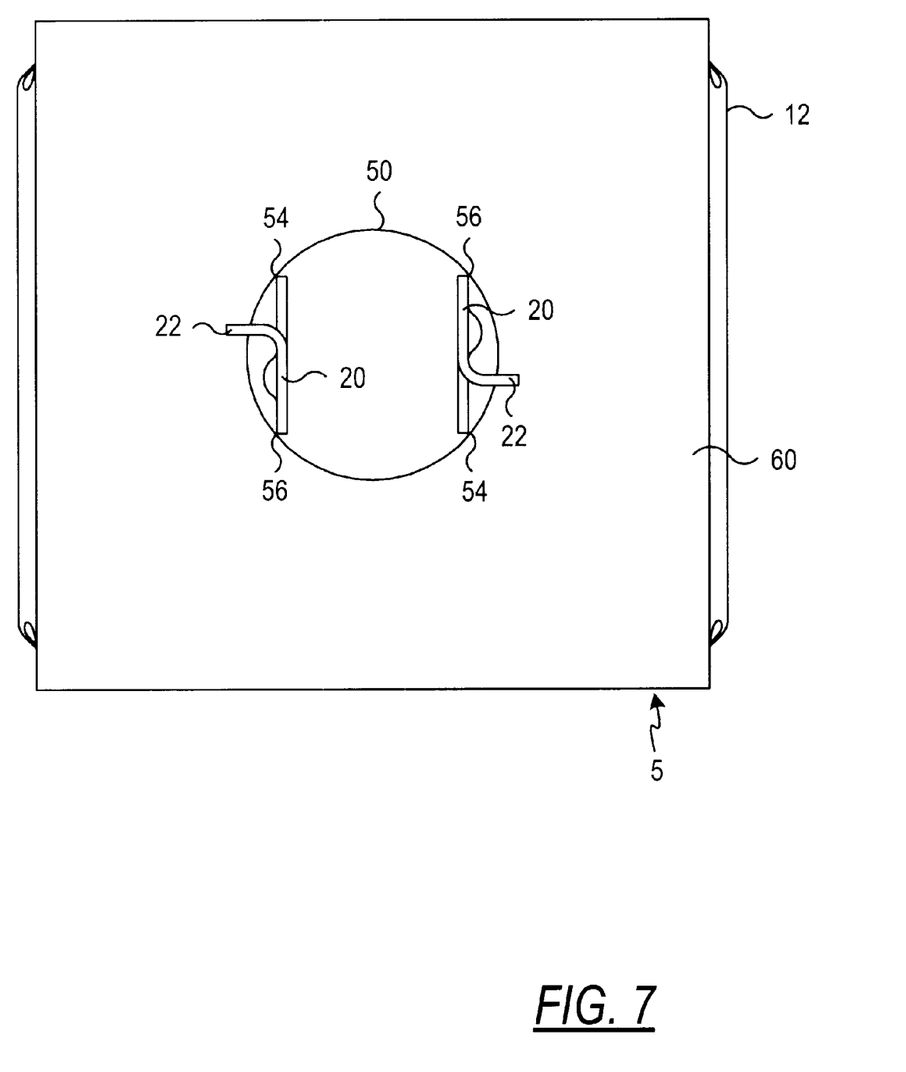
Figure 8:
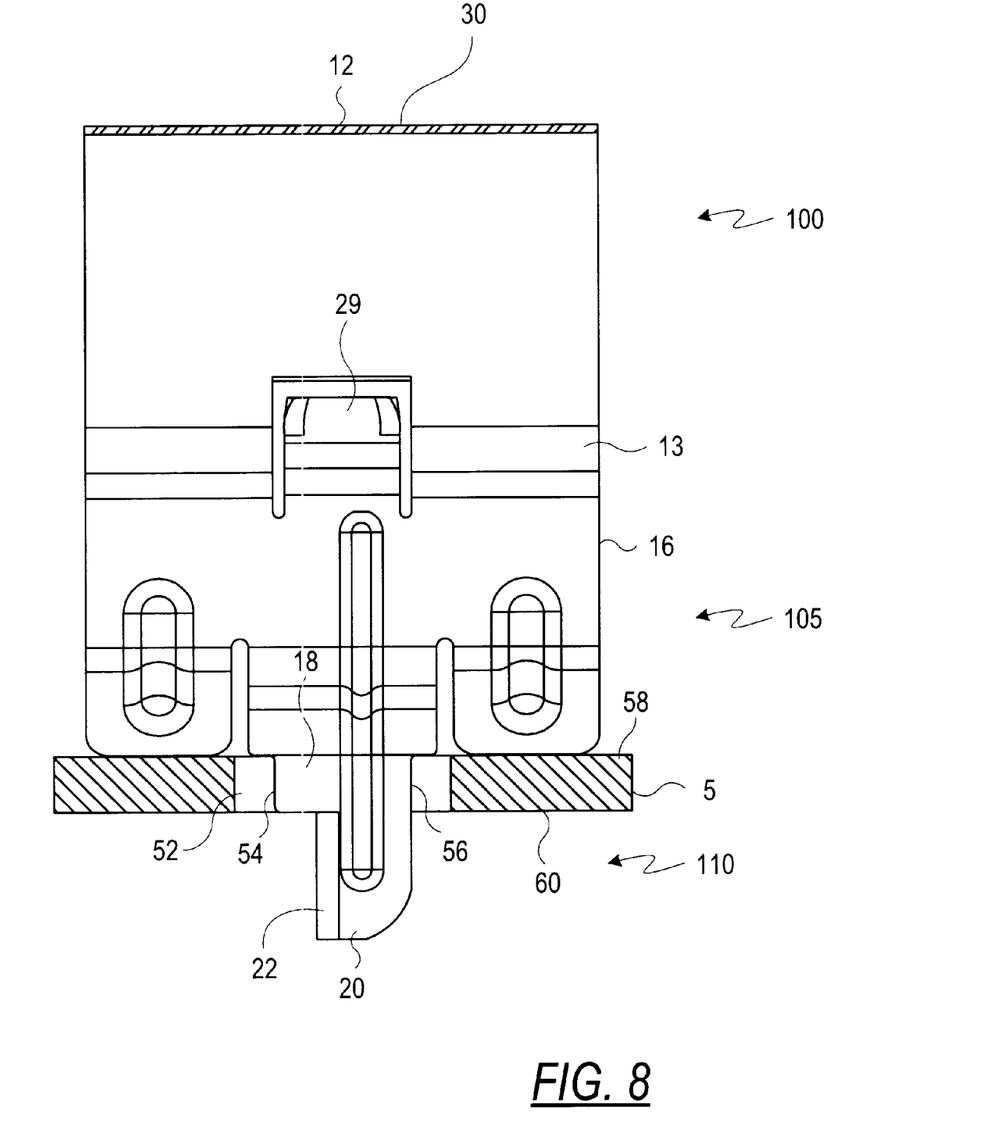
FIG. 8 is a cross-sectional view taken along line 8—8 in FIG. 6.
Figure 9:
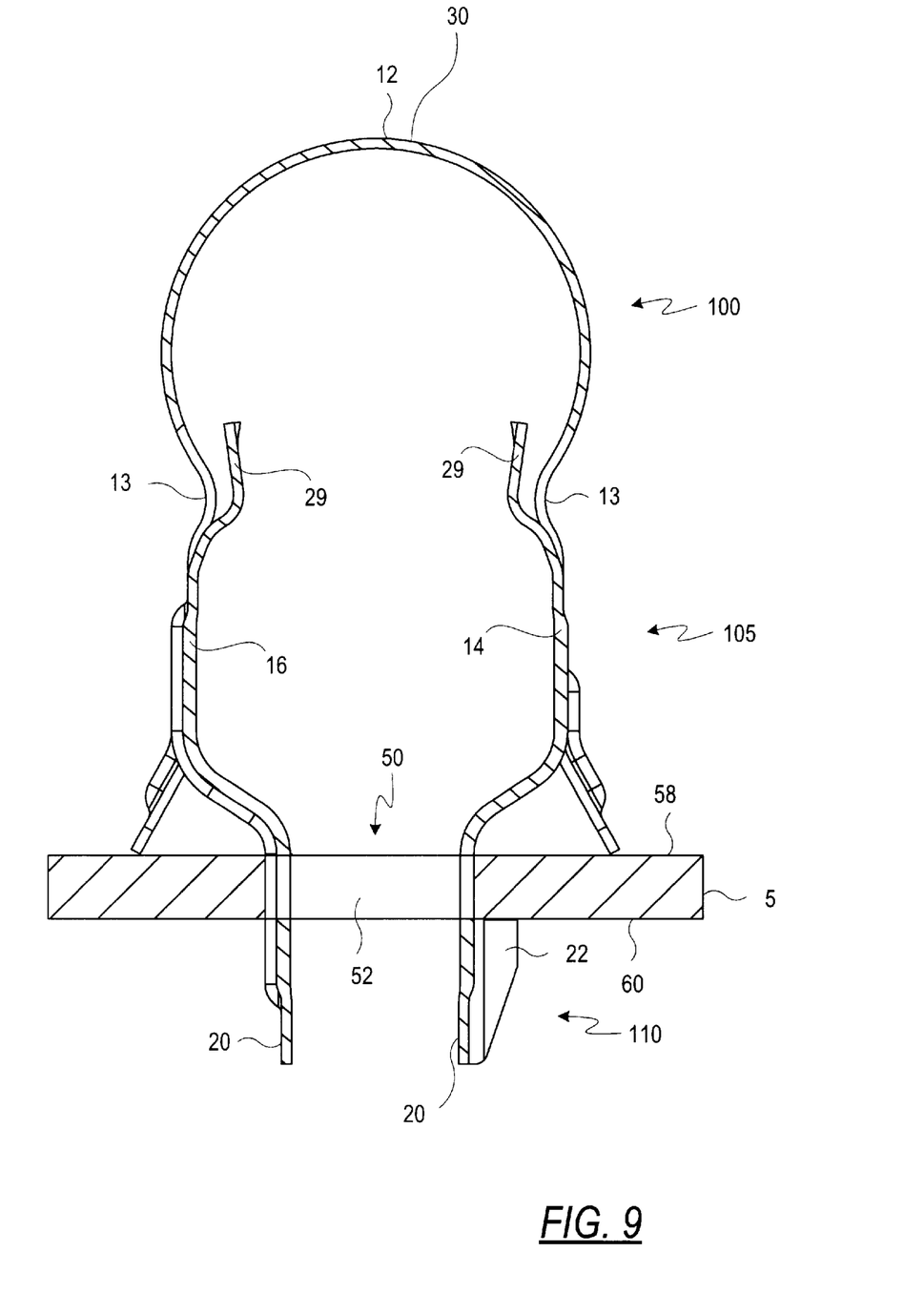
FIG. 9 is a cross-sectional view taken along line 9—9 in FIG. 5.

In use, the hanger 10 may be installed easily and quickly on the transmission line by pulling apart the legs 14 and 16 and slipping the hanger 10 over the transmission line such that the partially cylindrical member 12 is disposed around the transmission line and the spring fingers 29 are forced against the transmission line thus pressing the transmission line against the top portion 30 of the partially cylindrical member 12. The legs 14 and 16 are then pressed together to allow the locking barbs 22 to be inserted through the aperture 50, as illustrated in FIG. 7. The hanger 10 is inserted into the aperture 50 until the first sections 18 snap into contact with the supporting structure 5 at one or both of the pair of contact points 54 and 56 and the barb contact points 23 contact the inner surface 60 of the supporting structure 5, as illustrated in FIGS. 3a and 3b. This process is repeated for each hanger 10 that is installed along the length of the transmission line. FIGS. 5–9 illustrate different views of the hanger 10 installed in the supporting structure 5.

The hanger 10 can also be readily uninstalled and reused in another location. To uninstall the hanger 10, the legs 14 and 16 are pressed together to allow the locking barbs 22 to be removed from the aperture 50. Next, the partially cylindrical member 12 is slipped off the transmission line by pulling apart the legs 14 and 16 and disengaging the spring fingers 29 from the transmission line jacket.

Figure 10A:
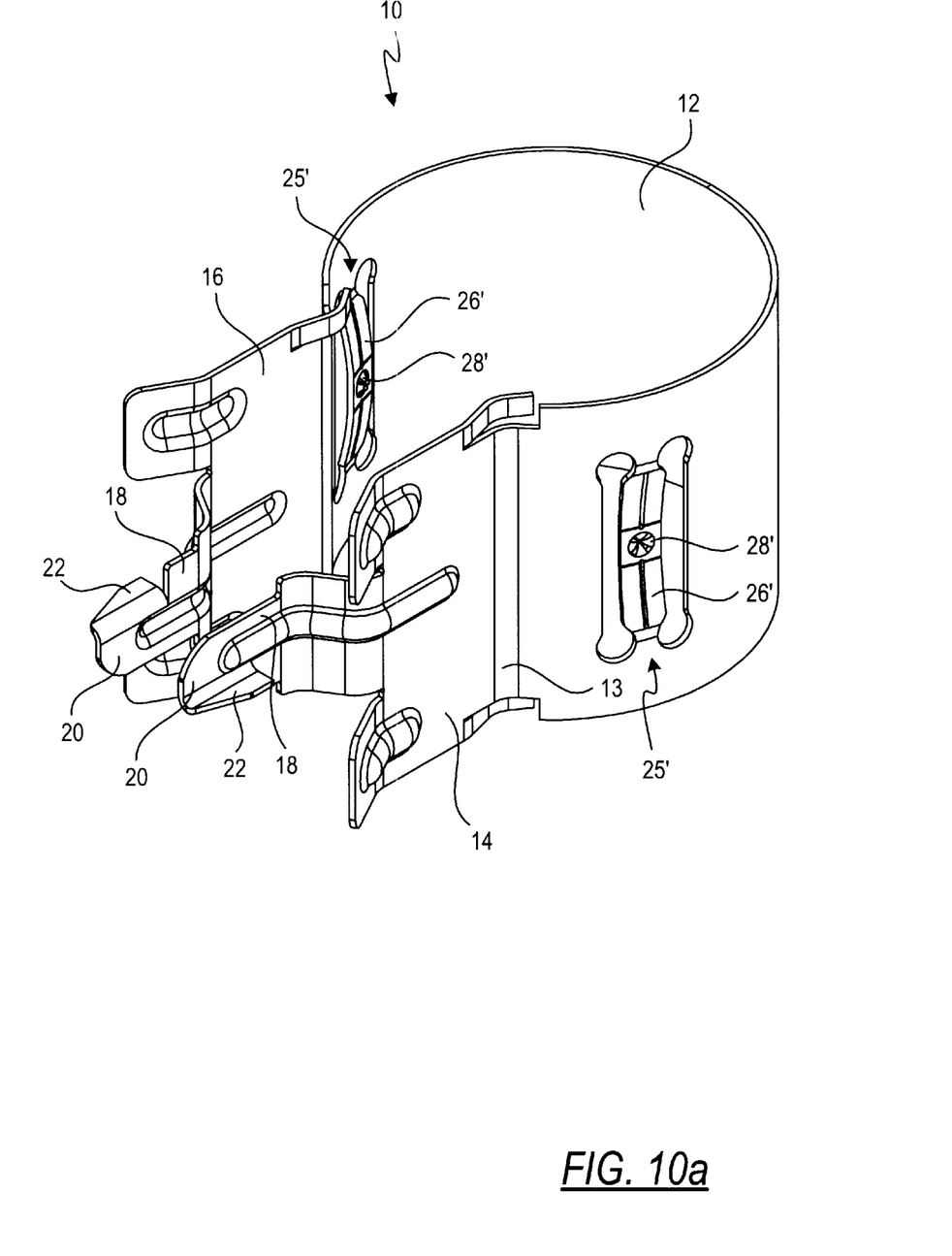
FIG. 10a is a perspective view of a transmission line hanger having areas of resistance.
Figure 10B:
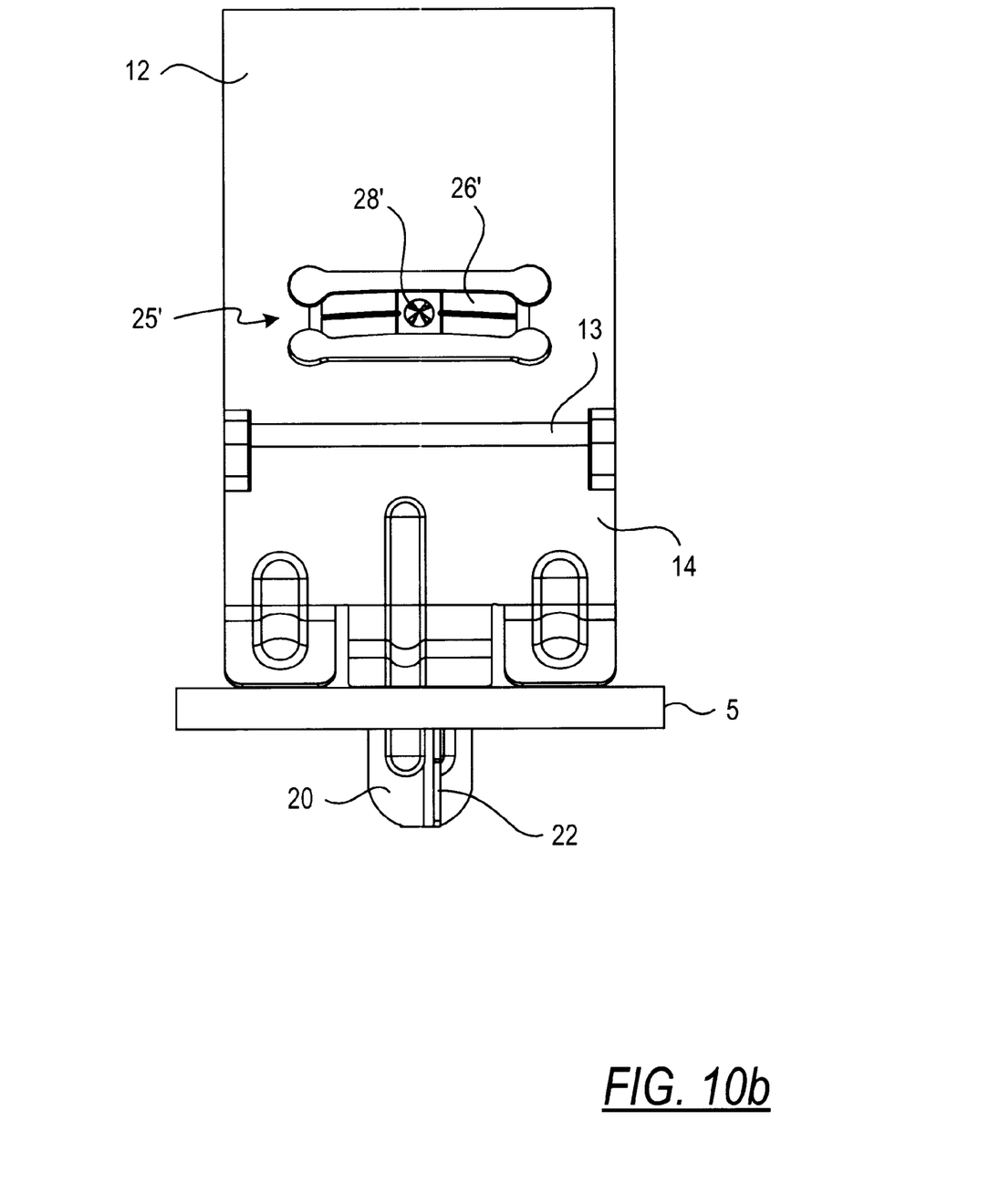

In another embodiment, the transmission line retention section 100 includes areas of resistance for retaining the transmission line and accommodating a large range of transmission line diameters. FIGS. 10a, 10b, 11a, and 11b illustrate two embodiments of the areas of resistance. FIGS. 10a and 10b illustrate two opposing areas of resistance 25' that each include an inwardly curved portion 26' and an indentation 28'. The curved portion 26' is attached to the partially cylindrical member 12 at each end and provides spring resistance against the transmission line after it is inserted in the hanger 10. The indentations 28' help further secure the transmission line within the hanger 10 by penetrating or biting into the jacket of the transmission line. Thus, the indentations 28' minimize the longitudinal movement of the transmission line in the hanger 10 and also help minimize transmission line vibration.

Figure 11A:
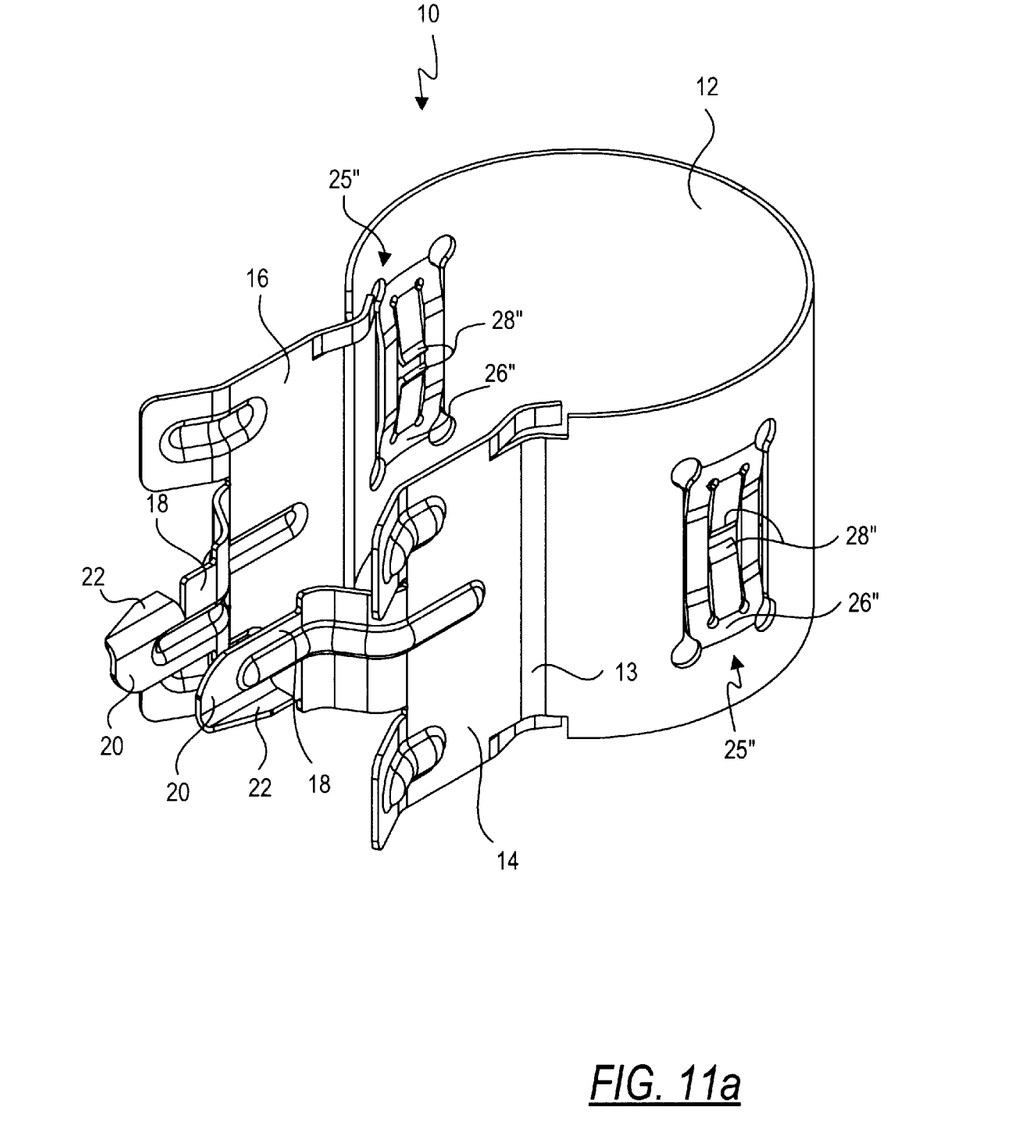
FIG. 11a is a perspective view of a transmission line hanger having areas of resistance.
Figure 11B:
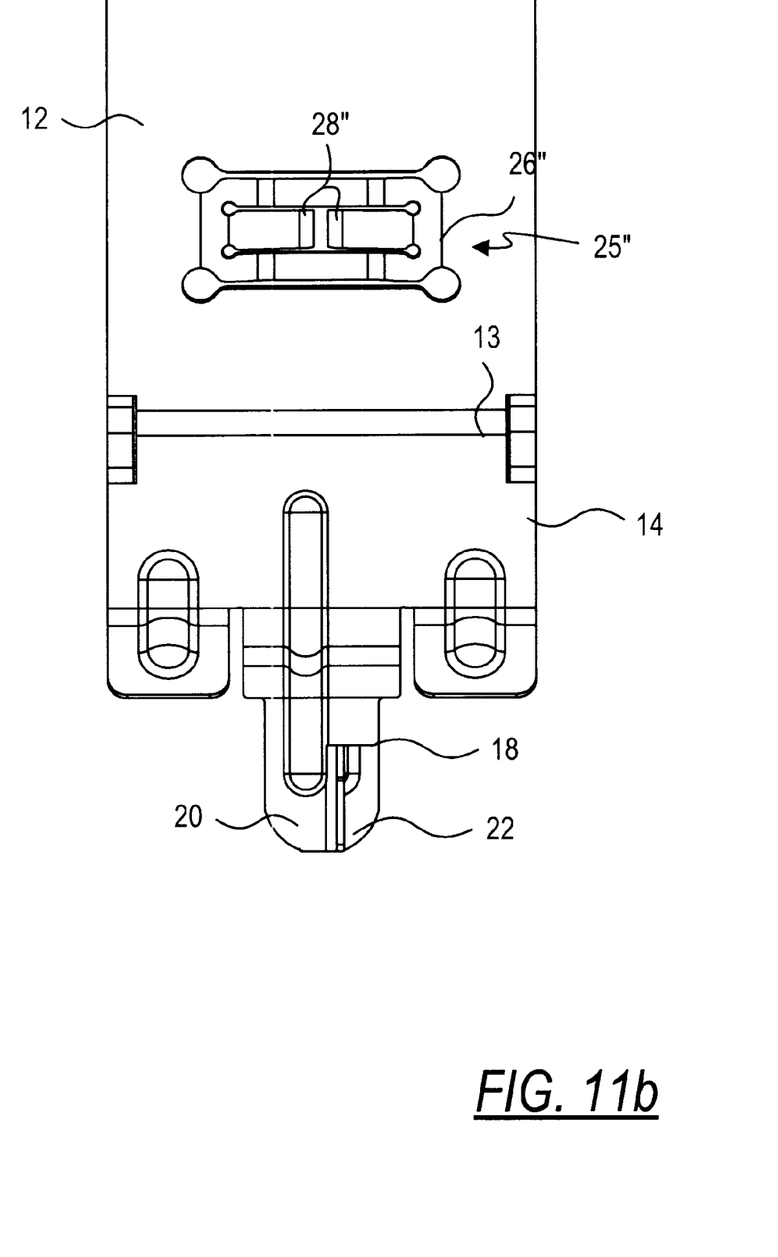

FIGS. 11a and 11b illustrate two opposing areas of resistance 25" that each include an inwardly curved portion 26" and a pair of tabs 28". The curved portion 26" is attached to the partially cylindrical member 12 at each end and provides spring resistance against the transmission line after it is inserted in the hanger 10. The inwardly bent tabs 28" help further secure the transmission line within the hanger 10 by penetrating or biting into the jacket of the transmission line. Thus, the tabs 28" minimizes the longitudinal movement of the transmission line in the hanger 10 and also help minimize transmission line vibration.

Having two opposing areas of resistance makes the orientation of the transmission line inserted into the hanger 10 irrelevant. No matter how the transmission line is disposed in the hanger 10 (e.g., the areas of resistance are in-between the corrugations of a corrugated cable or are in contact with one of the protruding corrugations), the two opposing areas of resistance will provide spring resistance against the transmission line and the indentation 28' or tabs 28" will penetrate into the jacket of the transmission line.

Other aspects, features, advantages and modifications of the present invention will become apparent to those skilled in the art upon studying this invention. All such aspects, features, advantages and modifications of the present invention are intended to be within the scope of the present invention as defined by the appended claims.

What is claimed is:

1. A transmission line hanger for securing a transmission line to a supporting structure having an aperture defined by a wall, said transmission line hanger comprising:
  a partially cylindrical member for accommodating the transmission line, said partially cylindrical member integral with a first leg and a second leg each of said legs respectively extending from said partially cylindrical member, said first and second legs allowing said hanger to accommodate various sizes of transmission lines, said first and second legs each including a first planar section for contacting said wall of said aperture at least with one of a pair of contact points, and a second section extending from said first section and including one angled locking barb adapted for locking against said supporting structure with a line contact once said locking barb is inserted through said aperture.

2. The transmission line hanger of claim 1, wherein said first section is adapted to contact said wall of said aperture at both of said pair of contact points.

3. The transmission line hanger of claim 1, wherein said partially cylindrical member includes areas of resistance for retaining the transmission line and accommodating transmission lines having various diameters.

4. The transmission line hanger of claim 1, wherein one of said first and second legs includes a spring finger flexibly connected thereto, and projecting inwardly therefrom.

5. The transmission line hanger of claim 4, wherein said spring finger is adapted to penetrate into a transmission line jacket to minimize longitudinal movement of said transmission line with respect to said hanger.

6. The transmission line hanger of claim 1, wherein said first leg includes a first spring finger flexibly connected thereto, and projecting inwardly therefrom, and said second leg includes a second spring finger flexibly connected thereto, and projecting inwardly therefrom.

7. The transmission line hanger of claim 1, wherein said locking barb extends from and is generally orthogonal to said second section.

8. The transmission line hanger of claim 1, wherein said supporting structure includes an outer surface and an inner surface, said locking barb including a barb contact point for contacting said inner surface of said supporting structure.

9. The transmission line hanger of claim 1, wherein said transmission line hanger is a unitary structure.

10. The transmission line hanger of claim 1, wherein said aperture is circular.

11. The transmission line hanger of claim 1, further including a compliant area disposed between each of said first and second legs, respectively, and said partially cylindrical member, said compliant area adapted to allow said first and second legs to be pressed together to enable said locking barbs to fit through said aperture.

12. The transmission line hanger of claim 11, wherein said compliant area is adapted to allow said first and second legs to expand by spring force to bring said first section into contact with said wall of said aperture at said at least one of a pair of contact points once said locking barb is inserted through said aperture.

13. The transmission line hanger of claim 1, wherein said locking barb is integral with said second section.

14. The transmission line hanger of claim 1, wherein said transmission line hanger is comprised of metal.

15. A method for securing a transmission line to a supporting structure having an aperture defined by a wall, said method comprising the steps of:
  placing a partially cylindrical member around the transmission line, said partially cylindrical member having a first leg and a second leg each respectively extending from said partially cylindrical member, each of said legs including a first planar section for contacting said wall of said aperture with at least one of a pair of contact points, and a second section extending from said first section and including an angled locking barb adapted for locking against said supporting structure once said locking barb is inserted through said aperture;
  inserting said locking barb through the aperture; and locking said locking barb against said supporting structure.

16. The method of claim 15, wherein said partially cylindrical member includes areas of resistance adapted to retain the transmission line and accommodating transmission lines having various diameters.

17. The method of claim 15, wherein one of said first and second legs includes a spring finger flexibly connected thereto, and projecting inwardly therefrom.

18. The method of claim 17, wherein said transmission line further includes a protective jacket, and further including the step of penetrating said spring finger into said jacket to minimize longitudinal movement of said transmission line with respect to said hanger.

19. The method of claim 15, wherein said first leg includes a first spring finger flexibly connected thereto, and projecting inwardly therefrom, and said second leg includes a second spring finger flexibly connected thereto, and projecting inwardly therefrom.

20. The method of claim 15, further including a compliant area disposed between each of said first and second legs, respectively, and said partially cylindrical member said compliant area adapted to allow said first and second legs to be pressed together to enable said locking barbs to fit through said aperture.

21. The method of claim 15, further including the step of contacting said first section with said wall of said aperture at one of a pair of contact points.

22. The method of claim 21, wherein said step of contacting includes contacting said first section with said wall of said aperture at both of said pair of contact points.

23. The method of claim 15, wherein said locking barb extends from and is generally orthogonal to said second section.

24. The method of claim 15, wherein said transmission line hanger is a unitary structure.

25. The method of claim 15, wherein said aperture is circular.

26. The method of claim 15, further including the step of pressing said pair of legs together to enable said locking barbs to fit through said aperture.

27. The method of claim 15, further including the step of expanding said pair of legs, by spring force, to bring said first section into contact with said wall of said aperture at least with one of a pair of contact points once said locking barb is inserted through said aperture.

28. The method of claim 27, wherein said first section is brought into contact with said wall of said aperture at both of said pair of contact points once said locking barb is inserted through said aperture.

29. The method of claim 15, wherein said locking barb is integral with said second section.

30. The method of claim 15, wherein said transmission line hanger is comprised of metal.

31. A transmission line hanger for securing a transmission line having a protective jacket to a supporting structure having an aperture defined by a wall, said transmission line hanger comprising:
a transmission line retention section including a partially cylindrical member for retaining the transmission line;
an extended section comprising a first leg and a second leg extending from said retention section, said extended section allowing said hanger to accommodate a plurality of different transmission line diameters, said extended section including a spring finger flexibly connected thereto, and projecting inwardly therefrom, said spring finger adapted for penetrating into said transmission line jacket and thereby minimizing longitudinal movement of said transmission line with respect to said hanger.

32. The transmission line hanger of claim 31, further including an attachment section extending from said extended section, said attachment section including a first planar section that extends from said extended section, said section adapted for contacting the wall of said aperture at least with one of a pair of contact points, said attachment section further including a second section extending from said first section and including one angled locking barb adapted for locking against said supporting structure once said locking barb is inserted through said aperture.

33. The transmission line hanger of claim 32, wherein said first section is adapted to contact said wall of said aperture at both of said pair of contact points.

34. The transmission line hanger of claim 32, wherein said locking barb extends from and is generally orthogonal to said second section.

35. The transmission line hanger of claim 31, wherein said supporting structure includes an outer surface and an inner surface, said locking barb including a barb contact point for contacting said inner surface of said supporting structure.

36. The transmission line hanger of claim 31, further including a compliant area disposed between said extended section and said partially cylindrical member that allows said first and second legs to be pressed together to enable said locking barbs to fit through said aperture.

37. The transmission line hanger of claim 32, wherein said compliant area allows said extended section to expand by spring force to bring said first section into contact with said wall of said aperture at one of a pair of contact points once said locking barb is inserted through said aperture.

38. The transmission line hanger of claim 32, wherein said locking barb is integral with said second section.

39. The transmission line hanger of claim 31, wherein said transmission line hanger is a unitary structure.

40. The transmission line hanger of claim 31, wherein said transmission line hanger is comprised of metal.

* * * * *